US012343756B2

(12) United States Patent
Govyadinov et al.

(10) Patent No.: US 12,343,756 B2
(45) Date of Patent: Jul. 1, 2025

(54) FLUID DISPENSING DEVICES WITH ENHANCED HEATING ELEMENTS FOR NON-AQUEOUS FLUIDS

(71) Applicant: Hewlett-Packard Development Company, L.P., Spring, TX (US)

(72) Inventors: Alexander N. Govyadinov, Corvallis, OR (US); Michael W. Cumbie, Corvallis, OR (US); Craig A. Olbrich, Corvallis, OR (US); Erik D. Torniainen, Corvallis, OR (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 16 days.

(21) Appl. No.: 18/278,367

(22) PCT Filed: Mar. 9, 2021

(86) PCT No.: PCT/US2021/021437
§ 371 (c)(1),
(2) Date: Aug. 22, 2023

(87) PCT Pub. No.: WO2022/191821
PCT Pub. Date: Sep. 15, 2022

(65) Prior Publication Data

US 2024/0050974 A1 Feb. 15, 2024

(51) Int. Cl.
*B05C 5/00* (2006.01)
*B05C 5/02* (2006.01)
*B41J 2/14* (2006.01)

(52) U.S. Cl.
CPC ............ *B05C 5/001* (2013.01); *B05C 5/0225* (2013.01); *B41J 2/14427* (2013.01)

(58) Field of Classification Search
CPC .... B05C 5/001; B05C 5/0225; B41J 2/14427; B41J 2/1404; B41J 2202/12; B41J 2/18
See application file for complete search history.

(56) References Cited

U.S. PATENT DOCUMENTS

| | | | | |
|---|---|---|---|---|
| 4,580,149 | A | 4/1986 | Domoto et al. | |
| 4,638,337 | A | 1/1987 | Torpey et al. | |
| 4,797,692 | A | 1/1989 | Ims | |
| 4,935,752 | A | 6/1990 | Hawkins | |
| 5,017,941 | A * | 5/1991 | Drake | B41J 29/377 347/18 |
| 5,300,968 | A | 4/1994 | Hawkins | |
| 6,113,221 | A | 9/2000 | Weber | |
| 8,496,324 | B2 | 7/2013 | Anthony et al. | |
| 8,628,190 | B2 | 1/2014 | Gila et al. | |
| 2009/0096839 | A1 | 4/2009 | Olbrich et al. | |

(Continued)

FOREIGN PATENT DOCUMENTS

| | | | |
|---|---|---|---|
| WO | 2011/043776 | A1 | 4/2011 |
| WO | 2020/036593 | A1 | 2/2020 |
| WO | 2020/190273 | A1 | 9/2020 |

*Primary Examiner* — Bradley W Thies
(74) *Attorney, Agent, or Firm* — Foley & Lardner LLP

(57) ABSTRACT

In some examples, a fluid dispensing device includes a fluid chamber, a heating element adjacent the fluid chamber, and an orifice adjacent the fluid chamber. A ratio of an area of a surface of the heating element to an orifice area of the orifice is greater than or equal to 3, where the surface of the heating element faces the fluid chamber.

14 Claims, 4 Drawing Sheets

(56) References Cited

U.S. PATENT DOCUMENTS

| | | | | |
|---|---|---|---|---|
| 2011/0310182 | A1* | 12/2011 | Mardilovich .......... | B41J 2/1603<br>347/56 |
| 2014/0118441 | A1 | 5/2014 | Lambright et al. | |

* cited by examiner

FLUID DISPENSING DEVICES WITH ENHANCED HEATING ELEMENTS FOR NON-AQUEOUS FLUIDS

CROSS-REFERENCE TO RELATED APPLICATIONS

This application is a U.S. National Stage Application under 35 U.S.C. § 371 of PCT/US2021/021437, filed Mar. 9, 2021, which is hereby incorporated by reference in its entirety.

BACKGROUND

A fluid dispensing system can be used to dispensing a fluid toward a target. For example, if the fluid dispensing system is a printing system, then a fluid dispensing device (e.g., a printhead) in the printing system can dispense a printing fluid to a print substrate.

BRIEF DESCRIPTION OF THE DRAWINGS

Some implementations of the present disclosure are described with respect to the following figures.

Figure 1:
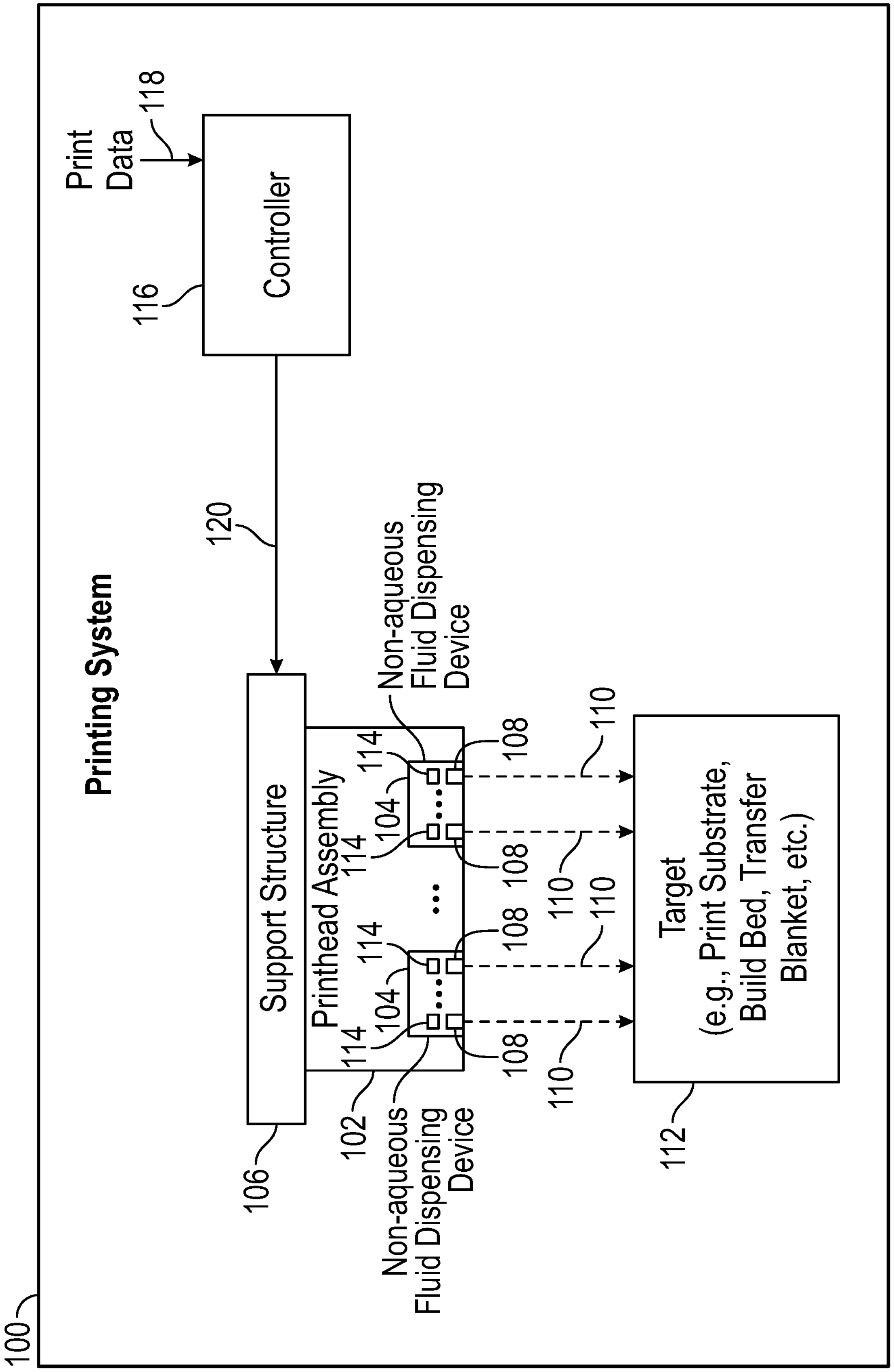
FIG. 1 is a block diagram of a printing system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, fluids dispensed by fluid dispensing devices include aqueous fluids. For example, a printhead of a printing system can dispense an aqueous ink onto a print substrate or other target.

A fluid dispensing device that dispenses an aqueous fluid can include a heating element, which can be in the form of a thermal resistor. The heating element when activated produces heat that can cause vaporization of the aqueous fluid to cause nucleation of a vapor bubble (e.g., a steam bubble) proximate the heating element that in turn causes dispensing of a quantity of fluid, such as ejection from an orifice.

In other examples, instead of dispensing an aqueous fluid, a fluid dispensing device can dispense a non-aqueous fluid, which can include oil (e.g., an oil-based carrier fluid), wax, alcohol (e.g., monoatomic or polyatomic alcohol), fluorocarbon, chlorocarbon, a polymer-based electrophotographic ink (e.g., kerosene-based ink containing Isopar™ X, etc.), and so forth. An oil-based carrier fluid can be used to carry another fluid. In some examples, an oil-based carrier fluid can include hydrocarbon (e.g., a petroleum-based aliphatic hydrocarbon, a palm oil-based aliphatic hydrocarbon, etc.), a silicone oil, fatty acid, fatty ether, and so forth. In more specific examples, an aliphatic hydrocarbon can include a composition $C_nH_{2n+2}$ where n=10 to 16 (e.g., Isopar™ G or Isopar™ L). In other examples, an aliphatic hydrocarbon or another non-aqueous fluid can have a boiling temperature that is above 100° C.

A non-aqueous fluid can have a higher boiling temperature than an aqueous fluid, or more generally may have another property that differs from that of the aqueous fluid. To cause dispensing of a non-aqueous fluid through an orifice of a fluid dispensing device, a heating element of the fluid dispensing device may have to produce more heat as compared to examples in which aqueous fluids are being dispensed.

To produce a greater amount of heat, an activation surface area of a heating element for heating a non-aqueous fluid in a fluid dispensing device can be increased as compared to a heating element used for heating an aqueous fluid in a fluid dispensing device. For example, an activation surface area of the heating element can be sized relative to an orifice area of an orifice through which the non-aqueous fluid is to be dispensed based on activation of the heating element. In an example, a ratio of the activation surface area of the heating element to an orifice area of the orifice can be greater than or equal to 3. As other examples, a ratio of the activation surface area of the heating element to an orifice area of the orifice can be greater than or equal to 4, greater than or equal to 5, greater than or equal to 6, and so forth. In a further example, a ratio of the activation surface area of the heating element to an orifice area of the orifice can be in a range between 3 and 20 or greater, between 4 and 20 or greater, or in another example range.

The activation surface area of a heating element refers to an area of the surface of the heating element that is exposed (either directly or indirectly through another layer) to the fluid to be dispensed. The heat produced by the heating element is proportional to the activation surface area (i.e., the greater the activation surface area of the heating element, the greater the heat produced by the heating element for heating the fluid in a fluid chamber of a fluid dispensing device). A larger activation surface area can result in creation of a larger vapor bubble in the fluid chamber.

The orifice area of an orifice refers to a cross-sectional area of an opening in the orifice through which fluid passes.

Due to chemical inertness and low cavitation energy of certain non-aqueous fluids, anti-cavitation layers and electrical isolation layers used in fluid dispensing devices that dispense aqueous fluids can be eliminated or reduced in thickness (discussed further below).

FIG. 1 is a block diagram of a printing system 100 according to some examples. The printing system 100 can be a two-dimensional (2D) printing system or a three-dimensional (3D) printing system. A 2D printing system can dispense a printing fluid onto a print substrate (e.g., paper, foil, textile, plastic, etc.). A 3D printing system (also referred to as an additive manufacturing machine) can build a 3D object on a layer-by-layer basis. As each layer of build material is successively deposited onto a build bed, a liquid agent can be deposited onto selected portions of the layer of build material. The layer can then be processed, such as by application of heat or UV radiation, to form a 3D part that is a portion of the overall 3D object being built.

Although reference is made to a printing system in some examples, it is noted that a fluid dispensing device according to some implementations can be used in other types of fluid dispensing systems, such as medical systems, fluid pump systems, vehicles, manufacturing plants, and so forth.

The printing system 100 includes a printhead assembly 102 that includes a number of fluid dispensing devices 104 according to some implementations of the present disclosure. The number of fluid dispensing devices 104 can include a single fluid dispensing device or multiple fluid dispensing devices.

The printhead assembly 102 is attached to a support structure 106, which can include a carriage, a print cartridge, a print bar, and so forth.

In some examples, a fluid dispensing device 104 can be in the form of a fluidic die. A "die" refers to an assembly where various layers are formed on a substrate to fabricate circuitry, fluid chambers, and fluid conduits. Multiple fluidic dies can be mounted or attached to a support structure, such as the support structure 106. In examples according to FIG. 1, a fluidic die can be a printhead die, which includes orifices 108 through which a printing fluid (e.g., an ink, a liquid agent, etc.) can be dispensed (110) towards a target 112. In some examples, a fluid dispensing device 104 is configured to dispense a non-aqueous fluid through orifices 108 to the target 112.

As examples, the target 112 can be a print substrate in a 2D printing system, a print bed in a 3D printing system, a transfer blanket, or another type of target. A transfer blanket refers to a member that is used to transfer a print image to another target, such as a print substrate. The transfer blanket can be in the form of a transfer belt, a drum, and so forth. In printing systems that use transfer blankets, a fluid dispensing device (e.g., 104) can be used to dispense a fluid (e.g., a non-aqueous fluid) as a marking agent onto selected portions of the transfer blanket. The printed marking agent on the transfer blanket corresponds to an image that can be transferred from the transfer blanket to a print substrate.

Non-aqueous fluids dispensed by fluid dispensing devices can be used to print on textiles, plastic surfaces, industrial processes, and so forth. Drying energy for drying non-aqueous fluids can be less than that for aqueous fluids, which improves efficiency by reducing usage of drying power. Some non-aqueous fluids may be less costly than aqueous fluids. Additionally, some non-aqueous fluids can have a wider and more adjustable color gamut than aqueous fluids.

Also, in some examples, non-aqueous fluids can increase the lifespan of fluid dispensing devices because the non-aqueous fluids are less chemically aggressive than aqueous fluids. Additionally, in some examples, decap time of fluid dispensing devices may be improved by using non-aqueous fluids as compared to aqueous fluids. Decap time refers to the amount of time that orifices of fluid dispensing devices can be left uncovered before they have to be wiped or purged.

A heating element 114 is associated with each orifice 108. In some examples, the heating element 114 can be in the form of a thermal resistor. When activated, a heating element 114 causes ejection of the non-aqueous fluid through a respective orifice 108.

In accordance with some implementations of the present disclosure, to allow for effective dispensing of the non-aqueous fluid, the relative sizes of the heating elements 114 and the orifices 108 are set to allow production of a sufficient amount of heat to dispense the non-aqueous fluid through the orifices 108. In addition, properties of activation signals used to control activation of the heating elements 114 can be controlled to achieve a target heat output.

By using heating elements 114 for dispensing non-aqueous fluids, a cost of the printing system 100 (e.g., a thermal inkjet printer) can be reduced as compared to a printing system that employs mechanical deflecting elements (e.g., piezoelectric elements) for dispensing non-aqueous fluids.

In some examples, the printing system 100 includes a controller 116 to control print operations according to print data 118 received by the controller 116. The controller 116 can control the properties of activation signals for the heating elements 114. An example of a property of an activation signal that can be controlled is an active time duration of the activation signal (i.e., the amount of time that the activation signal is active to turn on a heating element 114). In other examples, other properties of an activation signal can be controlled by the controller 116, such as an amplitude, pulse duration, or another property.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

The controller 116 can send, over a communication path 120 (a bus, a wireless link, a network, etc.), control data for controlling printing operations of the printhead assembly 102. The control data is used by the fluid dispensing device(s) 104 to control activation of heating elements 114. The controller 116 can also control movement of the support structure 106 and/or the target 112 during a print operation.

Figure 2:
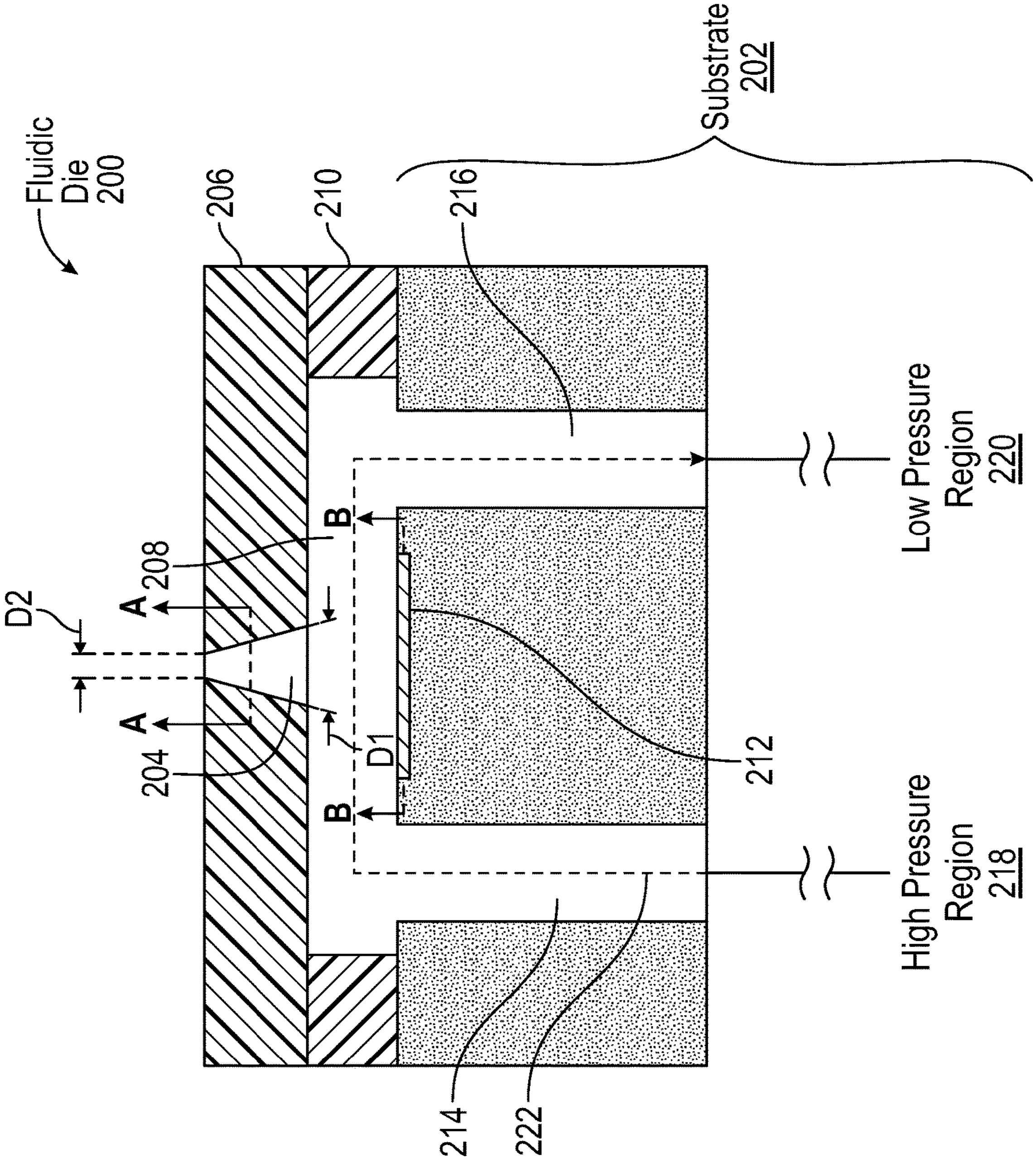
FIG. 2 is a schematic cross-sectional view of a fluid dispensing device according to some examples.

FIG. 2 is a schematic sectional view of a portion of a fluidic die 200, which is an example of a fluid dispensing device 104 in FIG. 1. The fluidic die 200 includes a substrate 202 on which various fluidic elements are formed to allow for dispensing of fluid. In the example of FIG. 2, fluidic elements associated with an orifice 204 are depicted. The fluidic die 200 includes multiple orifices 204, which can be associated with respective fluidic elements.

The substrate 202 can be a silicon substrate, or a substrate formed of another semiconductor material or a different material.

The orifice 204 is formed in an orifice layer 206. A fluid chamber 208, adjacent the orifice 204, is formed in a chamber layer 210. In the view of FIG. 2, the fluid chamber 208 is below the orifice 204. Note that terms such as "below," "above," "upper," "lower," and so forth that refer to relative orientations of elements can have different meanings depending upon the context. For example, in the view of FIG. 2, the fluid chamber 208 is below the orifice 204. During use, the fluidic die 200 may be oriented such that the orifice 204 points downwardly, in which case the fluid chamber 208 would be above the orifice 204. Thus, the terms "above," "below," "upper," "lower," and so forth can refer to different relative orientations of elements for respective different contexts.

The layers 206 and 210 can include epoxy-based photoresist (e.g., SU-8), a metal plate, silicon, another semiconductor material, or a different material.

A thermal resistor 212 is formed adjacent the fluid chamber 208. In the example shown in FIG. 2, the thermal resistor 212 is positioned below the fluid chamber 208.

The thermal resistor 212 can be formed using an electrically resistive material, such as polysilicon, tungsten-silicon nitride, a tantalum aluminum alloy, carbon, or another refractory and electrically conductive material. In some examples, the thermal resistor 212 can have a thickness in the range between 50 and 500 nanometers (nm). In different examples, the thermal resistor 212 can have a thickness in a different range.

When activated by an activation signal that is supplied to the thermal resistor 212 over electrical conductors (not shown), an electrical current passing through the thermal resistor 212 causes heating of the non-aqueous fluid in the fluid chamber 208. The heating of the non-aqueous fluid causes vaporization of the non-aqueous fluid to eject the non-aqueous fluid from the fluid chamber 208 through the orifice 204 to the outside of the fluidic die 200.

In examples according to FIG. 2, a fluid inlet 214 is fluidically coupled to the fluid chamber 208, and can supply the non-aqueous fluid from a fluid source (not shown) to the fluid chamber 208. A fluid outlet 216 is also communicatively coupled to the fluid chamber 208, and can receive the non-aqueous fluid (e.g., non-aqueous fluid not ejected through the orifice 204) from the fluid chamber 208.

In some examples, the fluidic die 200 supports circulation of the non-aqueous fluid through the fluid chamber 208. A circulation path is represented by arrow 222. The non-aqueous fluid can circulate (along the circulation path 222) from a high-pressure region 218 (e.g., a high pressure chamber in the substrate 202) through the fluid inlet 214, the fluid chamber 208, and the fluid outlet 216 to a low-pressure region 220 (e.g., a low pressure chamber in the substrate 202). The pressures of the non-aqueous fluid in the high-pressure region 218 and the low-pressure region 220 can be controlled by a pressure regulator assembly (not shown), which can be part of the fluidic die 200 or external of the fluidic die 200.

Figure 3A:
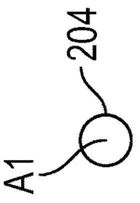
FIGS. 3A and 3B are cross-sectional views of an orifice and a heating element of the fluid dispensing device of FIG. 2, according to some examples.
Figure 3B:
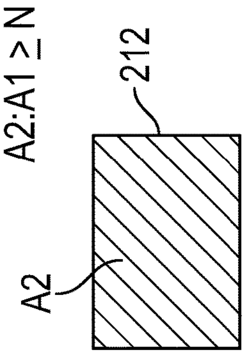

In accordance with some implementations of the present disclosure, the relative sizes of the thermal resistor 212 and the orifice 204 are set to support the dispensing of the non-aqueous fluid from the fluid chamber 208 through the orifice 204. FIG. 3A shows a cross-sectional view of the orifice 204 along section A-A in FIG. 2, and FIG. 3B is a cross-sectional view of the thermal resistor 212 along section B-B in FIG. 2.

In some examples, an activation surface area (represented as A2 in FIG. 3B) of the thermal resistor 212 that faces the non-aqueous fluid in the fluid chamber 208 is set based on the orifice area (represented as A1 in FIG. 3A) of the orifice 204.

In some examples, the ratio of A2 to A1 is greater than or equal N, where N is equal to 3, or 4, or another value greater than 3. In some examples, the ratio A2:A1 can be in the range between 3 and 20 or greater, 4 and 20 or greater, or in a different range.

By setting the activation surface area A2 of the thermal resistor 212 to be large enough relative to the orifice area A1, the thermal resistor 212 is able to heat the non-aqueous fluid in the fluid chamber 208 to greater than a target temperature to cause vaporization of the non-aqueous fluid (which can be higher than a target temperature for vaporizing an aqueous fluid). For example, to dispense the non-aqueous fluid in the fluid chamber 208, an operation temperature of the fluid chamber 208 heated by the activated thermal resistor 212 can be set to greater than or equal to M, where M=75° Celsius (C), 80° C., 85° C., 90° C., 95° C., 100° C., and so forth. The foregoing is compared to the operation temperature of a fluid chamber used for an aqueous fluid that can be in the range between 35° C. and 65° C.

Although FIGS. 3A-3B show the thermal resistor 212 as having a rectangular activation surface area and the orifice 204 as having a circular orifice area, in other examples, the thermal resistor 212 and the orifice 204 can have different cross-sectional shapes.

As shown in FIG. 2, the orifice 204 has different dimensions D1 and D2 at different sides of the orifice layer 206. At the lower side of the orifice layer 206, the orifice 204 has a dimension D1 (e.g., a first diameter), and at the upper side of the orifice layer 206, the orifice 204 has a different dimension D2 (e.g., a second diameter that is less from the first diameter). The orifice area A1 can be calculated based on the average (or another aggregate) of the dimensions D1 and D2, for example. The example orifice 204 has an angled wall that tapers from a wider opening (having the dimension D1) on the lower side of the orifice layer 206 to a small opening (having the dimension D2) on the upper side of the orifice layer 206. In other examples, the orifice 204 can have a straight wall that extends through the thickness of the orifice layer 206 such that the dimensions D1 and D2 are the same (to within manufacturing tolerances). In yet further examples, the orifice 204 can be tapered such that the opening at the lower side of the orifice layer 206 is smaller than the opening at the upper side of the orifice layer 206.

In some examples, the thermal resistor 212 is exposed directly to (i.e., is in direct thermal contact with) the non-aqueous fluid in the fluid chamber 208 (i.e., a layer or multiple layers is (are) not provided between the thermal resistor 212 and the non-aqueous fluid in the fluid chamber 208). For example, an anti-cavitation layer and an electrical isolation layer do not have to be provided between the thermal resistor 212 and the fluid chamber 208. For aqueous fluids, an anti-cavitation layer formed of silicon carbide can be provided between a thermal resistor and a fluid chamber to protect the thermal resistor from attack by chemically aggressive aqueous fluids. Also, because an aqueous fluid is electrically conductive, an electrical isolation layer (also referred to as a dielectric layer) can be provided between the thermal resistor and the fluid chamber. An example of an electrical isolation layer is a layer including silicon nitride.

The anti-cavitation layer and the electrical isolation layer can be omitted when used with non-aqueous fluids due to high dielectric properties and low critical pressures of some non-aqueous fluids.

In addition to setting the surface activation area of the thermal resistor 212 to the orifice area of the orifice 204 to a sufficient large ratio, the operation temperature in the fluid chamber 208 can also be increased by increasing the active time duration of an activation signal used to activate the thermal resistor 212. The active time duration of the activation signal used to activate the thermal resistor 212 can be adjusted (by the controller 116, for example) proportionally to the critical temperature of the non-aqueous fluid. A boiling temperature of the non-aqueous fluid may be proportional to the critical temperature of the non-aqueous fluid. Generally, the active time duration of the activation signal for heating a non-aqueous fluid is greater than the active time duration of an activation signal for heating an aqueous fluid.

In accordance with some implementations of the present disclosure, use of a non-aqueous fluid allows for the thickness of each of the orifice layer 206 and chamber layer 210 to be reduced as compared to thicknesses orifice and chamber layers used when fluid dispensing devices for aqueous fluids. For example, the chamber layer 210 can have a thickness in the range between 4 and 11 micrometers (μm) or in another thickness range, such as less than or equal P μm, where P is selected from any of 20, 15, 14, 13, 12, 11, 10, 9, 8, 7, 6, or 5. The thickness of the fluid chamber 208 can be less than or equal to 20 or another thickness, and can be the same as the thickness of the chamber layer 210. In some examples, the orifice layer 206 can have a thickness in the range between 9 and 11 μm or in another thickness range, such as less than or equal Q μm, where Q is selected from any of 15, 14, 13, 12, 11, or 10.

Also, because the chamber layer 210 is relatively thin, a primer layer does not have to be provided between the chamber layer 210 and the substrate 202. If the chamber layer 210 is relatively thick, such as chamber layers for aqueous fluids, a primer layer is used to start the formation of the chamber layer on the substrate. For example, a thin layer formed of SU-8 can be formed first on the substrate, to grow the rest of the chamber layer. However, since the chamber layer 210 for a non-aqueous fluid can be relatively thin, a primer layer does not have to be first deposited on the substrate 202, so that the chamber layer 210 can be attached to the substrate 202 without use of any primer layer.

In some examples, the orifice layer 206 can include a non-wetting material, which can include Polytetrafluoroethylene (PTFE) or the like. A non-wetting material prevents puddling of the non-aqueous fluid on the outside surface of the orifice layer 206.

In further examples, dynamic backpressure control can be used to reduce the puddling issue of the non-aqueous fluid on the outer surface of the orifice layer 206. Backpressure refers to the relative pressure of the supply of the non-aqueous fluid relative to the environment outside the fluidic die 200. The backpressure is kept such that the fluid supply pressure is less than the environment pressure, to effectively suck the non-aqueous fluid from the orifice 204 back into the fluid chamber 208.

Figure 4:
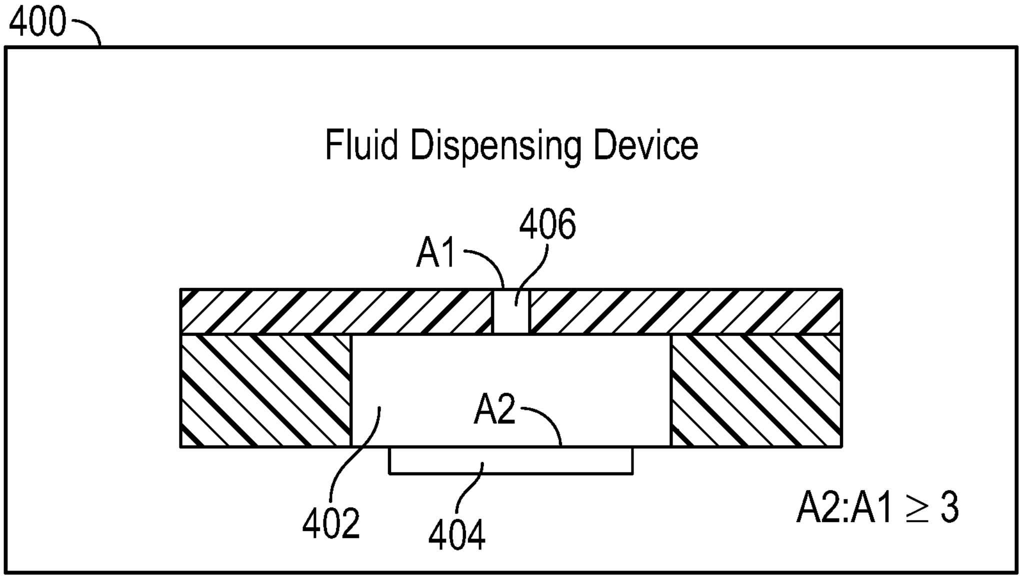
FIG. 4 is a block diagram of a fluid dispensing device according to some examples.

FIG. 4 is a block diagram of a fluid dispensing device 400 according to some examples. The fluid dispensing device 400 includes a fluid chamber 402, a heating element 404 adjacent the fluid chamber 402, and an orifice 406 adjacent the fluid chamber 402. A ratio of an area of a surface of the heating element 404 to an orifice area of the orifice 406 is greater than or equal to 3. The surface of the heating element 404 faces the fluid chamber 402.

In some examples, the heating element 404 includes a thermal resistor, and the surface of the heating element 404 is in thermal contact with a fluid in the fluid chamber 402 when the fluid is present in the fluid chamber 402.

Figure 5:
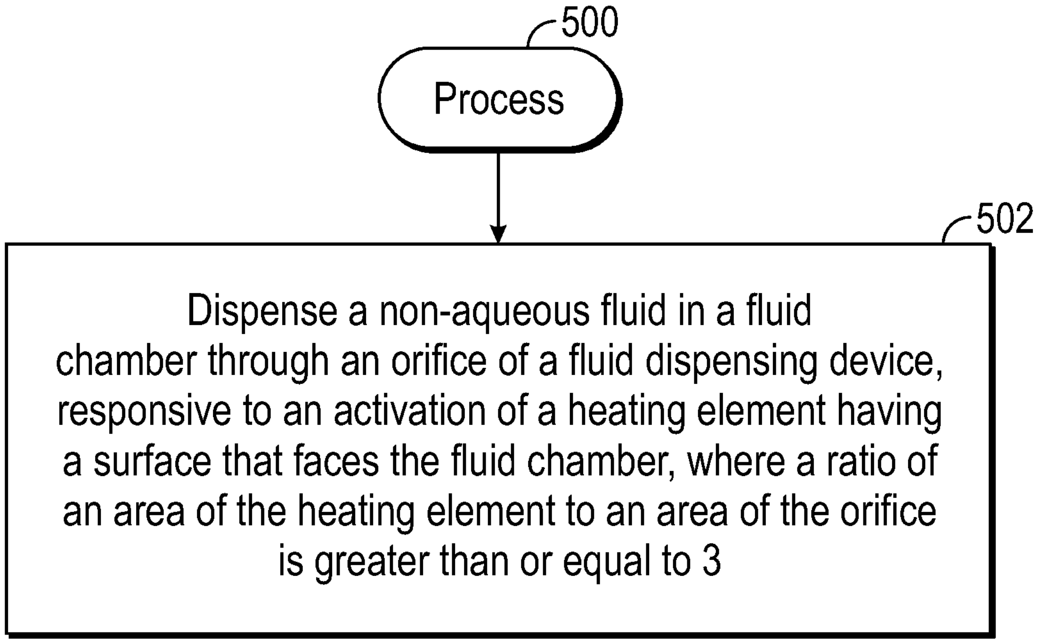
FIG. 5 is a flow diagram of a process of using a fluid dispensing device according to some examples.

FIG. 5 is a flow diagram of a process 500 according to some examples. The process 500 includes dispensing (at 502) a non-aqueous fluid in a fluid chamber through an orifice of a fluid dispensing device, responsive to an activation of a heating element having a surface that faces the fluid chamber, where a ratio of an area of the surface of the heating element to an area of the orifice is greater than or equal to 3.

Figure 6:
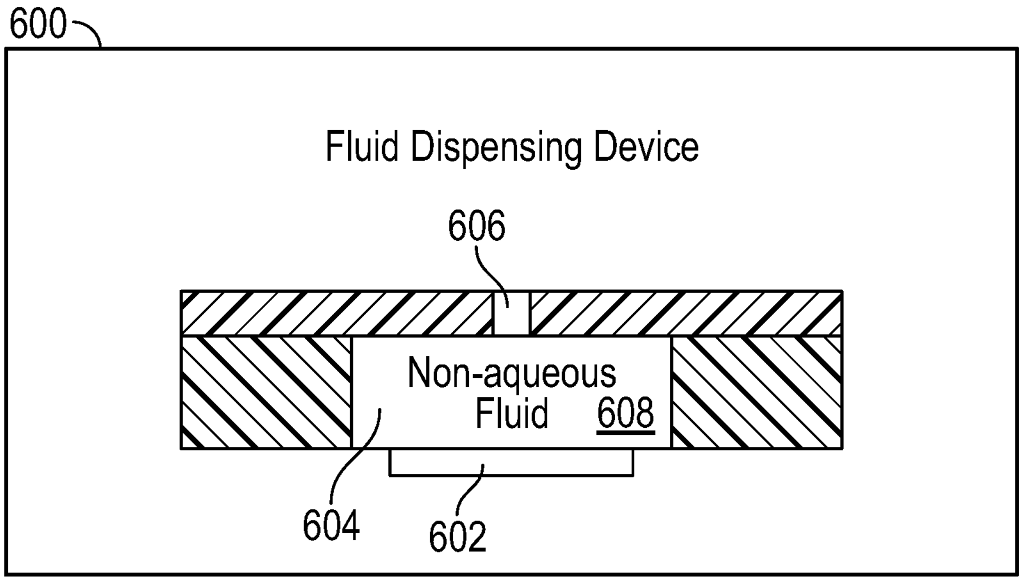
FIG. 6 is a block diagram of a fluid dispensing device according to further examples.

FIG. 6 is a block diagram of a fluid dispensing device 600 according to further examples. The fluid dispensing device 600 includes a thermal resistor 602, a fluid chamber 604, and an orifice 606 to dispense a non-aqueous fluid 608 in the fluid chamber 604 responsive to activation of the thermal resistor 602. The thermal resistor 602 is in thermal contact with the non-aqueous fluid 608 when the non-aqueous fluid 608 is present in the fluid chamber 604.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluid dispensing device comprising:
a fluid chamber;
a heating element adjacent the fluid chamber; and
an orifice adjacent the fluid chamber, wherein a ratio of an area of a surface of the heating element to an orifice area of the orifice is greater than or equal to 3, the surface of the heating element facing the fluid chamber,
wherein the heating element comprises a thermal resistor, and the surface of the heating element is in thermal contact with a fluid in the fluid chamber when the fluid is present in the fluid chamber.

2. The fluid dispensing device of claim 1, wherein a thickness of the fluid chamber is less than or equal to 20 micrometers.

3. The fluid dispensing device of claim 1, wherein dispensing the non-aqueous fluid in the fluid chamber is responsive to an activation of the heating element.

4. The fluid dispensing device of claim 3, wherein the activation of the heating element is to cause the non-aqueous fluid in the fluid chamber to reach a temperature exceeding 75° Celsius.

5. The fluid dispensing device of claim 3, where the non-aqueous fluid comprises aliphatic hydrocarbon having a composition CnH2n+2 where n=10 to 16.

6. The fluid dispensing device of claim 3, wherein the non-aqueous fluid has a boiling temperature above 100° Celsius.

7. The fluid dispensing device of claim 1, wherein the orifice is defined in an orifice layer, and the orifice layer comprises a non-wetting material.

8. The fluid dispensing device of claim 1, further comprising:
a fluid inlet to the fluid chamber; and
a fluid outlet from the fluid chamber,
wherein a circulation of a fluid flows from the fluid inlet to the fluid chamber and exits through the fluid outlet.

9. The fluid dispensing device of claim 1, further comprising:
a substrate,
wherein a chamber layer comprising the fluid chamber is attached to the substrate without use of a primer layer.

10. A method comprising:
dispensing a non-aqueous fluid in a fluid chamber through an orifice of a fluid dispensing device having a thermal resistor in thermal contact with the non-aqueous fluid when the non-aqueous fluid is present in the fluid chamber, responsive to an activation of a heating element having a surface that faces the fluid chamber,
wherein a ratio of an area of the surface of the heating element to an orifice area of the orifice is greater than or equal to 3.

11. The method of claim 10, further comprising:
circulating the non-aqueous fluid from a fluid inlet through the fluid chamber and to a fluid outlet.

12. The method of claim 10, further comprising:
setting an operation temperature in the fluid chamber to greater than equal 75° Celsius, or adjusting an active time duration of an activation signal for the heating element according to a critical temperature of the non-aqueous fluid.

13. The method of claim 10, wherein the non-aqueous fluid is dispensed through the orifice to one of:

a textile print substrate, a plastic print substrate, or a blanket to transfer a print image to a print substrate.

14. A fluid dispensing device comprising:

a thermal resistor;

a fluid chamber; and an orifice to dispense a non-aqueous fluid in the fluid chamber responsive to activation of the thermal resistor, wherein the thermal resistor is in thermal contact with the non-aqueous fluid when the non-aqueous fluid is present in the fluid chamber.

* * * * *